US012704286B2

(12) United States Patent
Karlicek, Jr. et al.

(10) Patent No.: US 12,704,286 B2
(45) Date of Patent: Aug. 11, 2026

(54) SENSOR FUSION FOR LOW POWER OCCUPANCY SENSING

(71) Applicant: Rensselaer Polytechnic Institute, Troy, NY (US)

(72) Inventors: Robert F. Karlicek, Jr., Mechanicville, NY (US); Arunas Tuzikas, Yorktown, VA (US); Tianna-Kae Woodstock, Paradox, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 377 days.

(21) Appl. No.: 18/274,494

(22) PCT Filed: Nov. 29, 2021

(86) PCT No.: PCT/US2021/060932
§ 371 (c)(1),
(2) Date: Jul. 27, 2023

(87) PCT Pub. No.: WO2022/164500
PCT Pub. Date: Aug. 4, 2022

(65) Prior Publication Data

US 2024/0318856 A1 Sep. 26, 2024

Related U.S. Application Data

(60) Provisional application No. 63/142,023, filed on Jan. 27, 2021.

(51) Int. Cl.
*F24F 11/65* (2018.01)
*F24F 120/12* (2018.01)
(Continued)

(52) U.S. Cl.
CPC ................ *F24F 11/65* (2018.01); *G01V 8/10* (2013.01); *F24F 2120/12* (2018.01); *H05B 47/115* (2020.01)

(58) Field of Classification Search
CPC ........ F24F 11/63; F24F 11/65; F24F 2120/10; F24F 2120/12; G01V 8/00; G01V 8/10; H05B 47/115
See application file for complete search history.

(56) References Cited

U.S. PATENT DOCUMENTS 8,446,470 B2 5/2013 Lu et al.
8,548,608 B2 10/2013 Perek et al.
(Continued)

OTHER PUBLICATIONS

International Search Report and The Written Opinion of the International Searching Authority, International Application No. PCT/US2021/060932, mailed Feb. 14, 2022.
(Continued)

*Primary Examiner* — Tameem D Siddiquee
(74) *Attorney, Agent, or Firm* — Barclay Damon LLP; Anthony P. Gangemi

(57) ABSTRACT

A system for detecting occupants in a room is provided. The system includes at least one first sensor configured to establish a background color map of the room in an unoccupied state and to detect color shift data resulting from at least one occupant entering the room, at least one second sensor configured to determine height data of the at least one occupant, and a controller configured to receive the color shift data and the height data and to generate equipment-control signals to operate at least one occupant-centric system.

15 Claims, 12 Drawing Sheets

(51) Int. Cl.

| | |
|---|---|
| ***G01V 8/10*** | (2006.01) |
| ***H05B 47/115*** | (2020.01) |

(56) References Cited

U.S. PATENT DOCUMENTS

| | | | | |
|---|---|---|---|---|
| 8,615,254 | B2 | 12/2013 | Jamtgaard et al. | |
| 9,014,829 | B2 | 4/2015 | Chemel et al. | |
| 9,872,153 | B2 | 1/2018 | Zampini, II | |
| 9,964,643 | B2 | 5/2018 | Maeda | |
| 10,165,650 | B1 * | 12/2018 | Fini | H05B 45/10 |
| 10,401,490 | B2 | 9/2019 | Gillian et al. | |
| 10,445,599 | B1 | 10/2019 | Hicks | |
| 10,485,068 | B2 | 11/2019 | Chemel et al. | |
| 10,524,335 | B1 * | 12/2019 | Thorington | H05B 47/16 |
| 10,627,512 | B1 | 4/2020 | Hicks | |
| 10,697,628 | B2 | 6/2020 | Rosko et al. | |
| 2012/0313588 | A1 * | 12/2012 | Carberry | F24F 11/30<br>320/134 |
| 2016/0286627 | A1 | 9/2016 | Chen et al. | |
| 2017/0135177 | A1 * | 5/2017 | Wang | H05B 45/00 |
| 2017/0193782 | A1 * | 7/2017 | Purohit | G01J 5/025 |
| 2017/0230194 | A1 | 8/2017 | Nie et al. | |
| 2018/0063674 | A1 * | 3/2018 | Hershey | H04B 10/11 |
| 2019/0021154 | A1 | 1/2019 | Sadwick | |
| 2019/0171892 | A1 | 6/2019 | Barth et al. | |
| 2019/0360714 | A1 | 11/2019 | Konrad et al. | |
| 2020/0041688 | A1 * | 2/2020 | Huff | G01S 17/42 |
| 2020/0137858 | A1 | 4/2020 | Boonen et al. | |

OTHER PUBLICATIONS

Woodstock, T.K., “Multisensor Fusion for Occupancy Detection and Activity Recognition in a Smart Room,” published Aug. 2020.

* cited by examiner

SENSOR FUSION FOR LOW POWER OCCUPANCY SENSING

CROSS REFERENCE TO RELATED APPLICATION(S)

This application is a U.S. National Stage Application of, and claims the priority benefit of, International Patent Application No. PCT/US2021/060932, filed Nov. 29, 2021, which claims the priority benefit of U.S. Provisional Patent Application No. 63/142,023, filed Jan. 27, 2021, the contents of which are incorporated by reference as if disclosed herein in their entireties.

STATEMENT REGARDING FEDERALLY SPONSORED RESEARCH AND DEVELOPMENT

The present invention was made with government support under Grant No. DE-AR0000942 awarded by the United Stated Department of Energy. The government has certain rights in the invention.

FIELD

The present technology generally relates to the area of occupancy sensing for building systems. More particularly, the present technology relates to occupancy sensing systems and methods that efficiently fuse color sensors and time-of-flight sensors.

BACKGROUND

In modern building designs, Occupant Centric Controls ("OCC") play a major role in improving the quality of life of occupants in the space while reducing building energy costs. In an occupant-aware space, building temperatures can be adjusted based on occupant location and activity, and lighting can be adjusted to appropriate levels for various activities (e.g., lower illuminance for projector presentations, higher illuminance for meetings, tunable spectral power distributions ("SPD") specific to certain use cases, etc.).

Unfortunately, many current modern buildings fail to truly achieve occupant-aware capabilities, failing to accurately identify the presence of occupants. Video-based systems are often computationally complex, but more importantly, can require high data processing overheads needed for image recognition. Additionally, video systems can struggle under changing light conditions and often incur privacy-concerns for occupants who feel watched when video-based systems are employed.

Ultrasonic sensors, another method explored for occupancy detection, require motion for detection and suffer from false positives (e.g., moving air streams from an HVAC system can be mistaken for occupants), resulting in unnecessary use of building resources. Ultrasonic sensors also have relatively high power consumption requirements, and most detrimentally, struggle with detecting stationary occupants. Ultrasonic sensors may also have difficulty correctly determining the distance to soft, curved objects. Passive infrared ("PIR") sensors, while also motion sensors that suffer from the same false positive scenarios that affect ultrasonic sensors (e.g., sudden thermal gradients in a moving air stream can be mistaken for occupants), passively sense changes in infrared radiation and, therefore, have much lower power requirements than ultrasonic sensors. Unfortunately, by relying on motion for detection, PIR sensors also struggle to detect occupants when they are relatively stationary, causing PIR-based building management systems to often turn off lights when occupants are present but stationary, resulting in increased occupant distraction and annoyance. Frequently, PIR and ultrasonic sensors can be combined to reduce false positive and false negative occupant detection events, but as they are both motion detectors, stationary occupants cannot be detected.

Color sensors provide an alternative occupancy detection modality. Whether occupants are moving or stationary, color sensors can detect the time dependent changes in reflected light SPDs caused by occupant presence and use this information to identify occupant presence and to localize occupants. Accurate knowledge on occupant presence allows for finer control of building systems (e.g., lighting and HVAC), resulting in greater energy savings. Color sensors are also simple, passive sensors and, therefore, have low power requirements. However, color sensor-based systems do not allow for discrimination in occupancy detection and movement tracking between human occupants versus color changes that can be caused by pets moving through the monitored area.

Thus, a need exists for an improved occupancy sensor system that addresses the foregoing problems.

SUMMARY

According to an exemplary embodiment of the present technology, a system for detecting occupants in a room is provided. The system includes at least one first sensor configured to establish a background color map of the room in an unoccupied state and to detect color shift data resulting from at least one occupant entering the room, at least one second sensor configured to determine height data of the at least one occupant, and a controller configured to receive the color shift data and the height data and to generate equipment-control signals to operate at least one occupant-centric system.

In some embodiments, the controller is further configured to generate sensor-control signals to operate the at least one second sensor in response to receiving the color shift data from the at least one first sensor.

In some embodiments, the at least one second sensor is further configured to determine velocity data of the at least one occupant and to communicate the velocity data to the controller.

In some embodiments, the at least one first sensor includes RGB color sensors.

In some embodiments, the at least one second sensor includes time-of-flight sensors.

In some embodiments, the at least one occupant-centric system includes a lighting system to illuminate the room.

In some embodiments, the at least one occupant-centric system includes an HVAC system to supply conditioned air to the room.

In some embodiments, the controller is further configured to assign a digital label to the at least one occupant for tracking the at least one occupant's position in the room.

According to another exemplary embodiment of the present technology, a method for detecting occupants in a room is provided. The method includes the steps of: detecting, via a first sensor system, the spectral reflectance of the room in an unoccupied state to determine a background color map of the room; detecting, via the first sensor system, color shift data resulting from at least one occupant entering the room and changing the spectral reflectance of the background color map; communicating the color shift data to a controller configured to generate sensor-control signals in response to receiving the color shift data; communicating the sensor-control signals to a second sensor system to power on and operate the second sensor system; detecting, via the second sensor system, height data of the at least one occupant; communicating the height data to the controller; generating, via the controller, equipment-control signals to operate at least on occupant-centric system; and communicating the equipment-control signals to the at least one occupant-centric systems.

In some embodiments, the method further includes the steps of: detecting, via the second sensor system, velocity data of the at least one occupant; and communicating the velocity data to the controller.

In some embodiments, before the step of generating equipment-control signals, the method further includes the step of: analyzing the height data to determine whether the at least one occupant is a human.

In some embodiments, the method further includes the steps of: assigning a digital label to the at least one occupant; and tracking the at least one occupant's position in the room.

In some embodiment, the second sensory system includes a plurality of time-of-flight sensors.

In some embodiments, the at least one occupant-centric system includes a lighting system to illuminate the room.

In some embodiments, the at least one occupant-centric system includes an HVAC system to supply conditioned air to the room.

Further objects, aspects, features, and embodiments of the present technology will be apparent from the drawing figures and below description.

DETAILED DESCRIPTION

Figure 1:
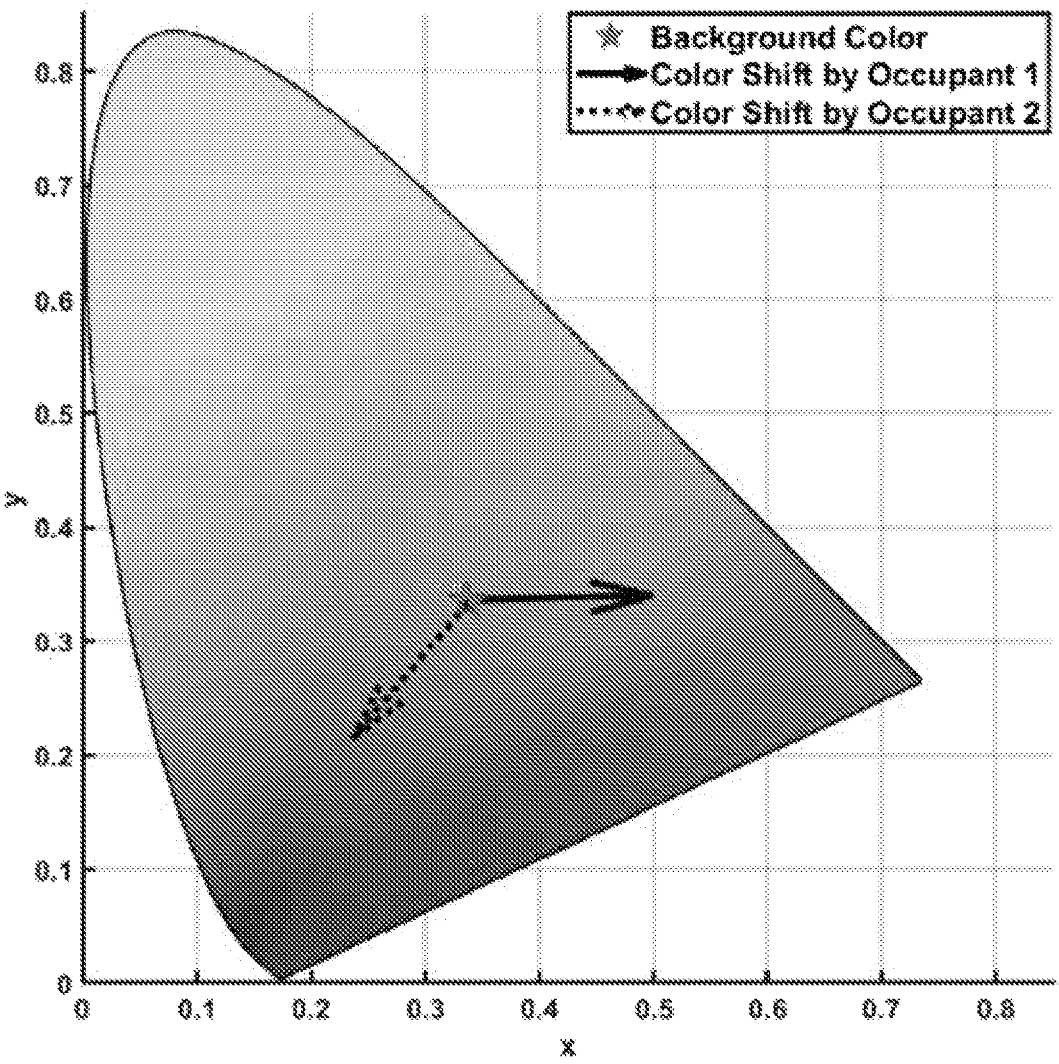
FIG. 1 is an xy chromaticity ("CIE") diagram showing shifts from background color caused by different occupants in view of different color sensors in a room according to an exemplary embodiment of the present technology.

Accordingly, embodiments of the present technology are directed to an occupancy sensor system having color sensors and time-of-flight ("TOF") sensors for improved occupancy detection and localization in a smart, occupant-aware environment. Low cost TOF sensors can be used for high-accuracy, privacy-preserving occupancy sensing for smart building operation. In some embodiments, to minimize energy consumption, an ultra-low power color sensor is used to detect presence and wake-up a more energy intensive TOF sensor for precise position and direction of travel sensing. In some embodiments, a network of low-resolution, cost-effective RGBC color sensors are used to detect changes from an established background color map (which, in some embodiments, is established by the color sensors) for an unoccupied room caused by occupant presence in the room. This color information is combined with information from other sensors (e.g., TOF sensors) for improved detection and tracking capabilities.

In some embodiments, color sensors are combined with low cost TOF sensors that can measure the presence of occupants using IR light to measure distance and movement. This sensor fusion combination is used for a comprehensive presence detection sensor system that can distinguish between animals (e.g., pets) and humans. In some embodiments, the color sensor is used to save energy in the TOF sensor operation be detecting presence while the TOF sensor is off or in energy-saving sleep mode, waking it to make a distance and velocity of travel measurement before returning to sleep. In some embodiments, this sensor fusion combination is part of a comprehensive occupant presence detection system for smart buildings such as manufacturing operations, hospital, eldercare, and assisted living operations.

An efficient occupant detection system should accurately detect information on occupant count, occupant pose (activity), and maintain occupant labels (or have some way to correct incorrectly swapped labels) during periods of occupant interaction. Regarding occupant detection and tracking, TOF sensors potentially have the limitation that as occupants interact, their labels may switch, and if the occupants are of similar height, the system may struggle to correctly reassign occupant labels. However, inclusion of color sensor information allows the sensor system to determine optimal label reassignment on the bases of height and local spectral reflectance. Some TOF sensor-based systems may also struggle to sufficiently count occupants during dense and highly mobile occupant scenarios (such as the start and end of large meetings), leading to missed entries (incorrect occupant count) and/or missed exits (failure to realize the room is now empty). With only depth as a feature for distinguishing between objects and occupants, in situations of missed entries or exits, the TOF sensor network would need either shape information (requiring more expensive, higher resolution sensors) or detection of sudden large motions (such as an occupant standing up, waving their arms, etc.) to correctly update the occupant count. However, adding color information, per embodiments of the present technology described herein, allows for further separation between animate and inanimate objects rather than just using height.

For an unoccupied room under static lighting conditions, while the room remains free of sources of dynamic lighting, such as moving objects or changes in illumination, the spectral reflectance map or color of a room is expected to remain unchanged. However, if an occupant whose local spectral reflectance is different than that of the unoccupied room enters the room, the pre-occupant color of the room will change, creating a color shift that will make that occupant detectable for as long as that occupant remains in the room. Additionally, the shift has an associated direction in the xy color space as a result of the occupant's spectral reflectivity. By monitoring the color direction of color shifts that are detected by the color sensors at the door, embodiments of the present technology continue to track the detection of the occupant identified color shift as the occupant moves throughout the room, being detected by other sensors.

FIG. 1 shows a CIE diagram of an exemplary embodiment where two occupants wearing different colored clothing are positioned under two different color sensors. As these occupants do not have the same spectral reflectance as the room objects, there are detectable color shifts from the established baseline spectral map of the room. In this exemplary embodiment, Occupant 1 (having a color shift indicated by the solid arrow in FIG. 1) is wearing a blue shirt and Occupant 2 (having a color shift indicated by the dotted arrow in FIG. 1) is wearing an orange shirt. The length of the arrows show the magnitude of the color shift from the established background color (i.e. how different the new color is from the background color), whereas the direction of the arrows provides information about the color of the new object. The magnitude of the color shift has been multiplied by a factor of five so the shift can be seen on the CIE diagram.

While the exemplary embodiment shown in FIG. 1 involves a drastic difference in occupant clothing color, such color difference is not required in other embodiments for the system to detect and distinguish between occupants. This is because the detected color shifts depend not only on the spectral reflectance properties of an occupant's clothing but also the spectral reactance properties of the occupant's skin, hair, etc., as well as the spectral reflectance of the room objects that are now blocked from (or added to) the field-of-view ("FOV") of the sensor as a result of occupant presence that are different than before the occupant entered the room.

In preferred embodiments, the system includes color and TOF sensors. In some embodiments, the TOF sensors are relatively high-resolution, high-power sensors discretizing a 1.25 m×1.75 m area on the ground of the space being monitored by the system (e.g., a room) into 500 pixels of depth information. In some embodiments, the TOF sensors are positioned at a height of 2.82 m, although the present technology is not limited thereto as the height of the TOF sensor can be higher or lower, depending on the space being monitored. However, despite the resolution of these sensors and the utilization of image processing techniques for detecting and tracking occupants, these sensors still struggle to reflectively distinguish and count a high density of occupants that are moving closely together, for example, at the start/end of a meeting resulting in missed occupants during entry/exit and, therefore, incorrect occupant counts (e.g., one large person versus two more slender persons standing in close proximity to each other). Furthermore, as the employed system assumes correct entry/exit detection, missed occupant counts tend to propagate through the system in time. For the color sensors to provide an added benefit to the TOF sensor information, it is necessary to ensure that there are some applications where TOF sensors struggle that the color sensors may excel. For example, as many TOF based algorithms focus on detecting new occupants (and exiting occupants) by incorporating knowledge on the location of the door(s) and looking for changes from the established background originating at the door area, it is important that embodiments of the fused sensor network using color sensors also be able to detect new occupants at the boundaries of the scene.

In some embodiments, the TOF sensor detects an occupant's velocity (speed and direction) as they move through a space. The combination of the TOF sensor data (e.g., height data) and color sensor color shift data are tied to that occupant's direction of travel. In embodiments where an occupied space is equipped with a sparse network of integrated TOF/color sensors, one sensor detecting a particular height/color-shift signature for an occupant and an associated velocity communicates that signature for that particular occupant so that that signature is recognized by another integrated TOF/color sensor device in the occupied space where the two sensors are physically separated and do not have an overlapping FOV. This capability facilitates the correct handoff for different zones of an occupied space as occupants tagged by height and color shift enter the domain of a distant integrated TOF/color sensor that would recognize that individual as having moved into a zone from another previously occupied zone in an occupied space.

In some embodiments, a sparse network of properly located integrated TOF/color sensors, by associating color shift data and height data, is used to accurately track and count occupants as they move about an occupied space. The network of TOF/color sensors is part of an occupancy sensing system that includes, in some embodiments, a controller in communication with the TOF/color sensors. The controller is configured to receive the color shift data and the height data and to generate equipment-control signals to operate one or more occupant-centric building systems, such as systems for zone control of lighting intensity, HVAC systems, analysis systems for space utilization related to how occupants traverse a space, etc. In some embodiments, before generating the equipment-control signals, the controller is configured to analyze the height data and/or the velocity data to determine whether the detected occupant is an animal (e.g. a pet) or a human. In some embodiments, the system saves power by having a minimal amount of sensors active (e.g., one sensor at an entry zone of the space) until a sensor (color sensor or TOF sensor) determines data (color shift data, height data, and/or velocity data) of an occupant entering a space and communicates that data to the controller, which then activates additional sensors to track the occupant's movement within the space. In some embodiments, the sparse mesh network of integrated TOF/color sensors is combined with a map of the space and integrated with machine learning capabilities to, for example, recognize movement patterns, assign path probabilities for occupants, and account for the fact that movement through or over obstacles in the space would be highly unlikely. Combined with accurate entry/exit sensing in an occupied space, this sparse mesh network would maintain an occupant map and an accurate count of occupancy as occupants move about the space.

In some embodiments, the sparse network of integrated TOF/color sensors is used for discerning between normal and abnormal movement and rate of movement patterns in an occupied space. For example, fast movement of occupants in a particular direction could signal a hazard or problem in the space and provide an early warning to a building security system of an emergency. Similarly, in certain occupied spaces, unusual movement patterns or unusual occupant aggregation in one location could also be a sign of an abnormal situation that could warrant attention (e.g., sudden injury or illness of an occupant in the space). In such embodiments, the network of integrated TOF/color sensors notifies appropriate personnel and/or security systems to assess the new situation.

Figure 2:
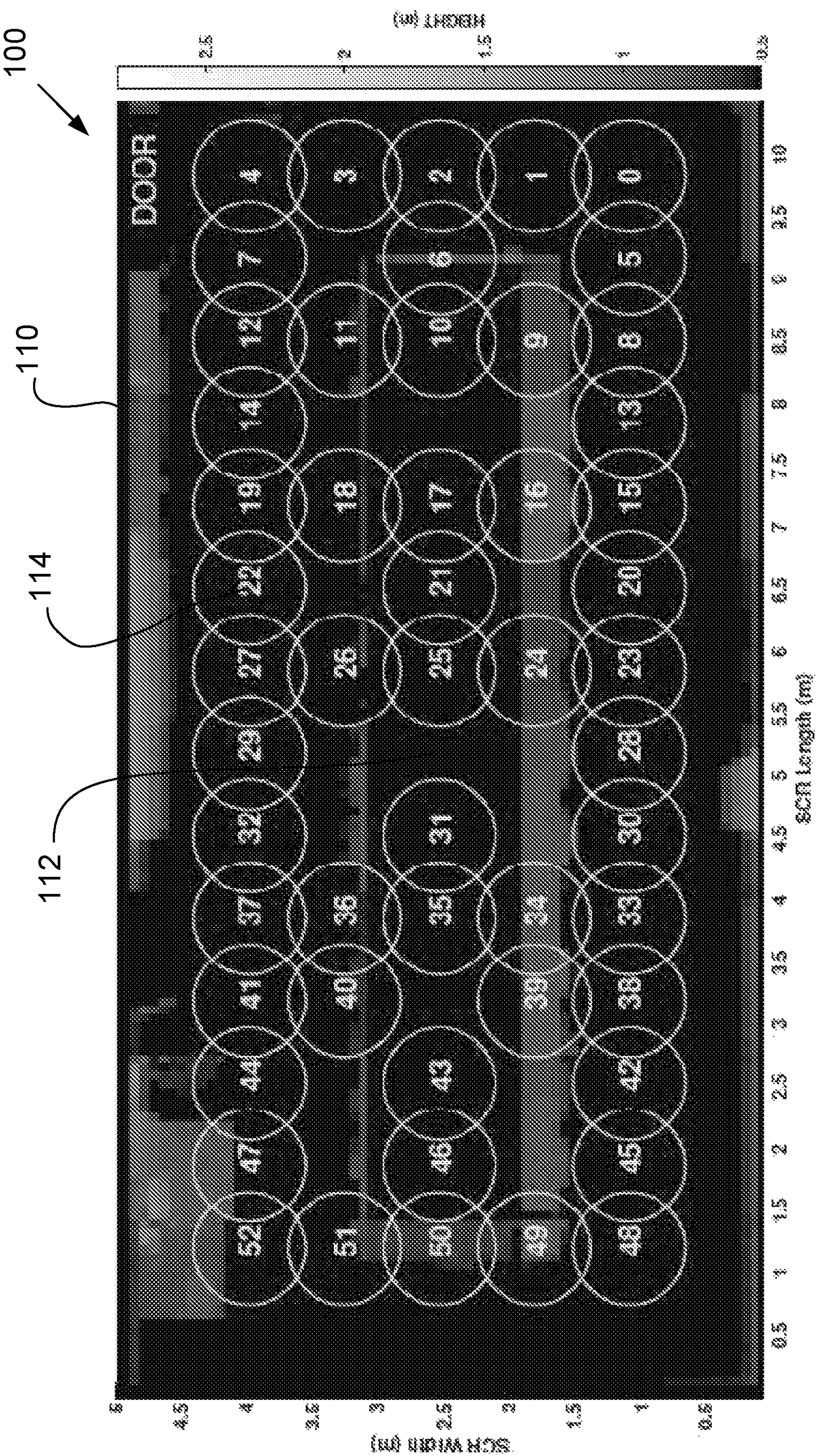
FIG. 2 is a TOF image showing the detection areas of color sensors in a room according to an exemplary embodiment of the present technology.

In an exemplary embodiment, a meeting in a smart conference room ("SCR") 110 of four occupants wearing different colored clothing is used to evaluate the ability of the color sensors to differentiate among the different occupants using color information based on the occupants' respective local spectral reflectance. The occupancy sensing system 100 uses TOF information to determine the location of the occupants and the color shifts of the color sensors in the room 110 within range of the occupants are monitored for detected shifts from the background color. FIG. 2 shows a TOF image of the detection area of the SCR 110. In some embodiments, the TOF sensors are unable to see directly above certain obstacles in the room 110, such as the table 112. The blue circles overlaying the TOF image depict the location and estimated sensing range of the color sensors 114 in the SCR 110. In some embodiments, the system 100 includes a plurality of color sensors 114 positioned throughout the room 110, such as the fifty-three color sensors 114, labeled 0 to 52, shown in FIG. 2. In some embodiments, the system 100 includes one or more TOF sensors that are located separate from, but in communication with, the plurality of color sensors 114. In some embodiments, the system 100 includes a plurality of TOF sensors, each of which are coupled with a respective one of the plurality of color sensors 114.

Figure 3:
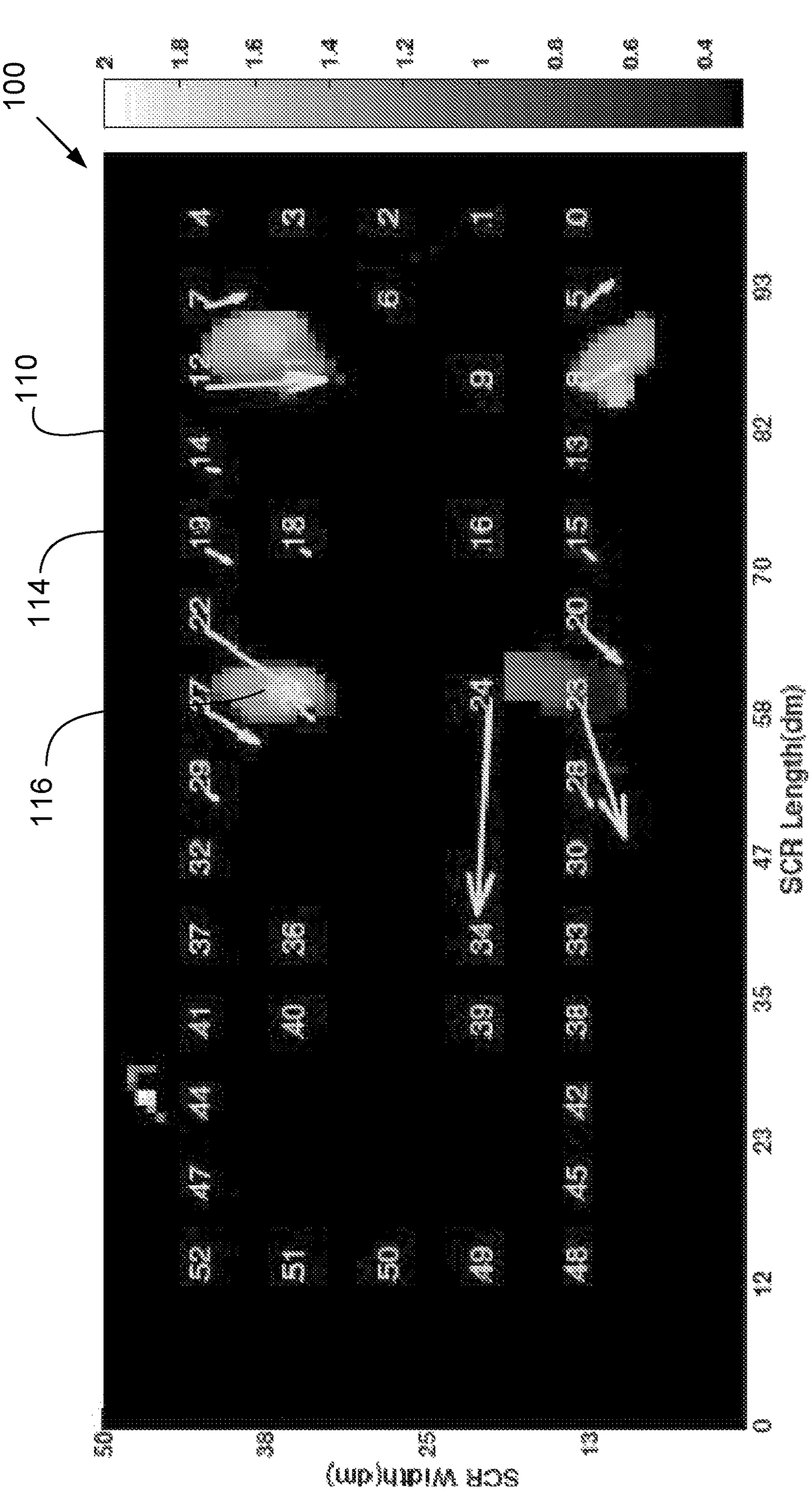
FIG. 3 is a TOF image of four occupants wearing different colored clothing having separately entered the room of FIG. 2.

FIG. 3 shows a TOF image of the four occupants 116 as they enter the room 110 (from the top right of the image) and make their way into the room 110. The color sensors 114 above each occupant 116 sense local color shifts in the direction of the xy color space denoted by their spectral reflectance. The blobs on the TOF image show the location of the occupants 116 as seen by the TOF sensors while the blue arrows show the magnitude (denoted by the length of the arrow) and the direction of the detected color shift. While there are expected large and obvious color shifts at the locations of the occupants 116 determined by the TOF data, there are also smaller detected color shifts, in neighboring color sensors 114 caused by the occupant presence that appeared to extend outside the detectable spatial range of the color sensors 114. However, in such a medium occupant density scenario, with such a low volume of entry and occupants wearing different colored clothing, the color sensors 114 are able to detect unique color shifts for the occupants that act as a feature for label reassignment in a split/merge scenario.

Figure 4:
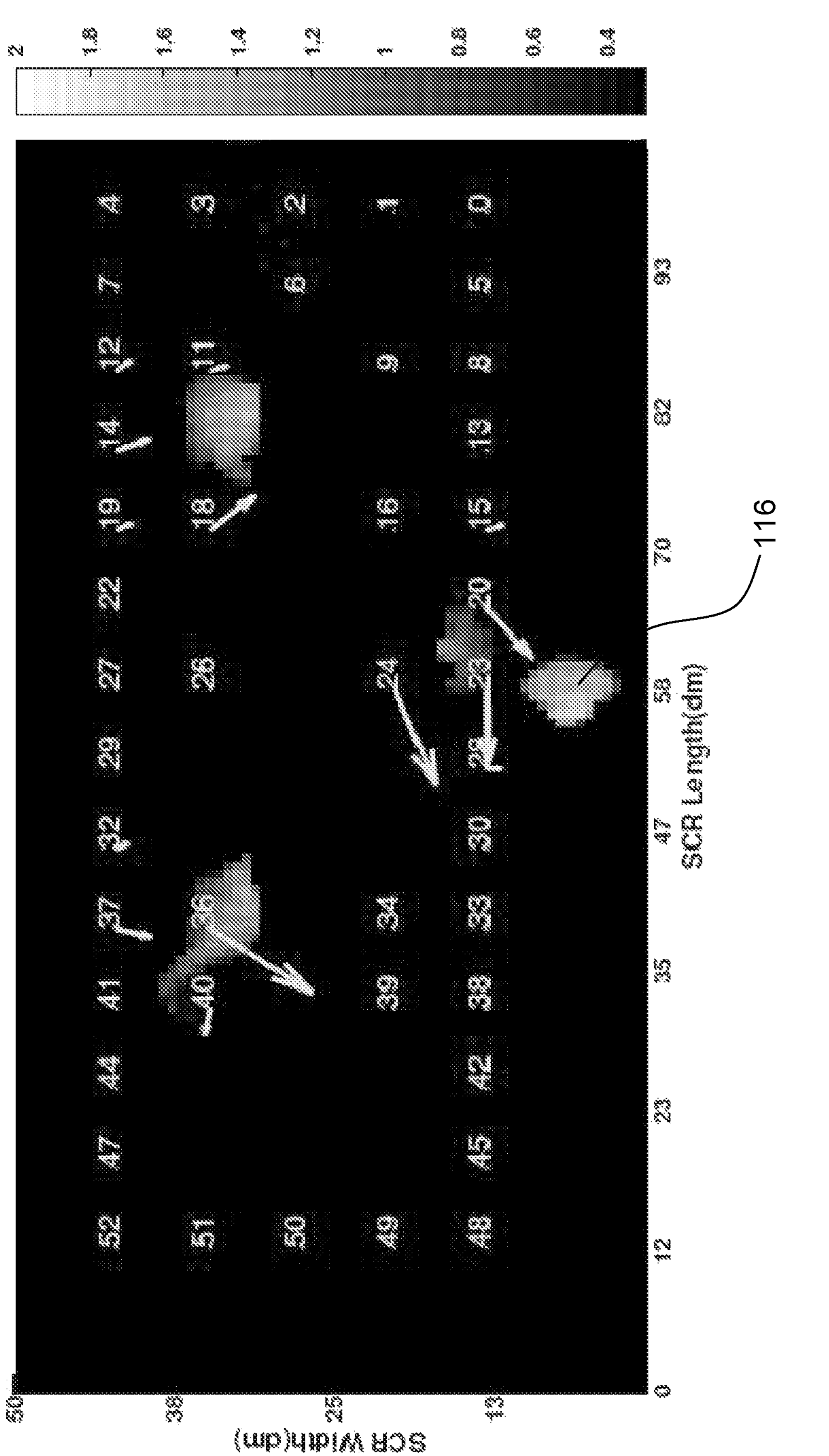
FIG. 4 is a TOF image showing two occupants of FIG. 3 passing near each other and in view of the same color sensor.

In some embodiments, after determining that the color sensors 114 were able to detect occupant color at the door, the response of the color sensors 114 in a merge scenario was determined when, occasionally, two occupants 116 who are close together merge into a single blob and the TOF system is temporarily unable to detect both occupants 116. One such possible scenario is shown in FIG. 4 as the two occupants 116 at the bottom of the image pass near each other. As the two occupants 116 at the bottom of the image go by each other, the color sensor 114 (sensor 23) is unable to resolve the color of both occupants 116, and the detected response is dominated by the occupant 116 closest to the sensor 114. Blue arrows indicate the unfiltered magnitude and direction of the color shift from the background color determined by the occupant's local spectral reflectance. Similarly, for the color sensors, as the two occupants 116 enter the same sensing zone, there are also large changes in the detected directions and magnitudes of the color shifts that are closest to both occupants 116 (notably, sensors 23, 24, and 28, compared to FIG. 3) suggesting that the color sensors 114 are also aware that something has changed at that location.

Figure 5:
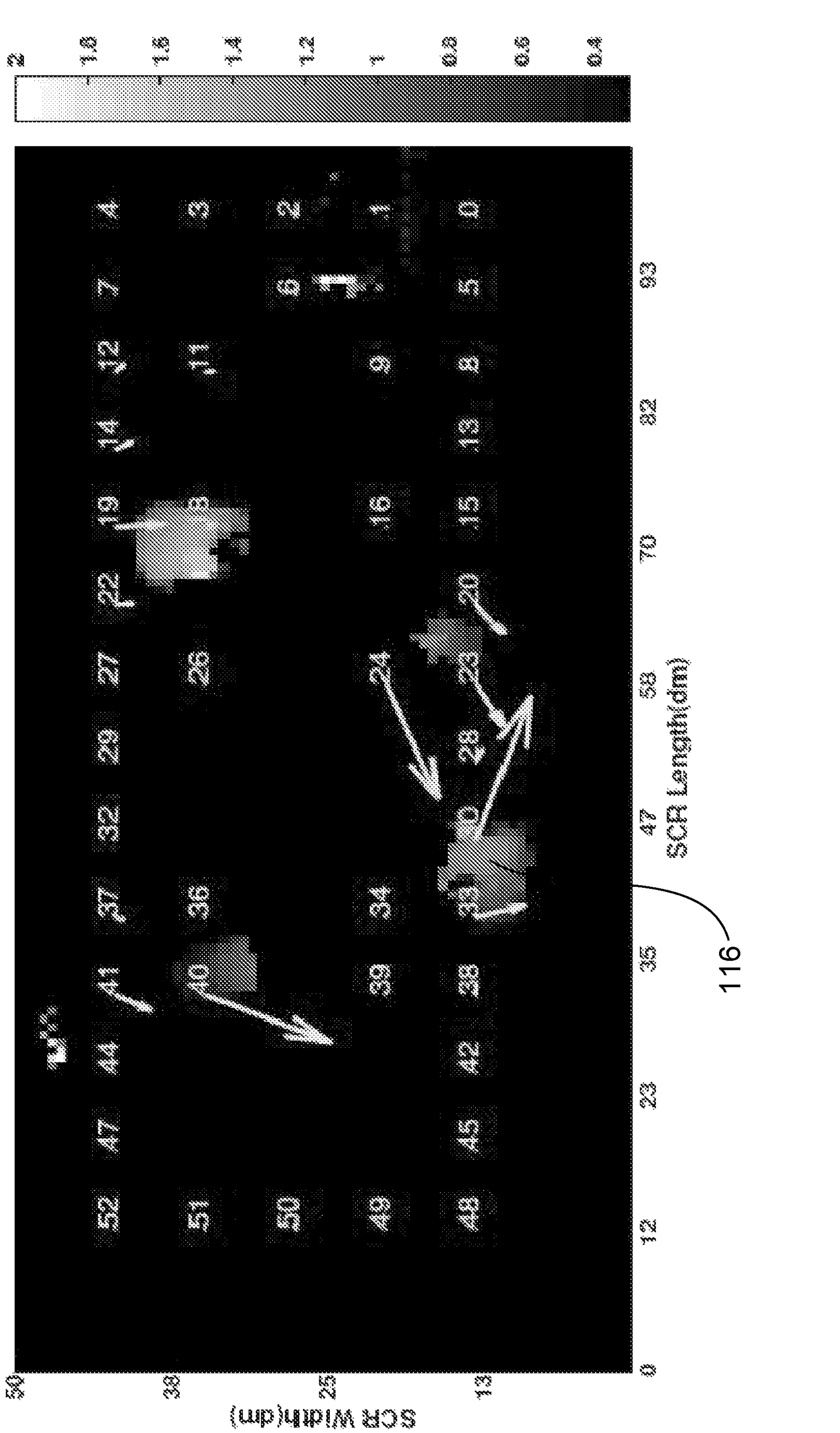
FIG. 5 is a TOF image after the two occupants of FIG. 4 are no longer in the view of the same color sensor.

In some embodiments, the system 100 uses the occupant color information previously identified on entry to re-identify occupants 116 that have split from a merge scenario and may have swapped labels. In FIG. 4, as the two occupants 116 entered the same sensor zone, the color sensors 114 were no longer able to match the occupants 116 by their previously detected colors. However, once the occupants 116 are no longer in the same color sensor zones, the closest color sensor 114 to each occupant 116 is once again able to detect the unique color shift directions of each of the occupants 116 that had previously been assigned on entry and correct any possible tracking errors, as shown in FIG. 5.

Figure 6:
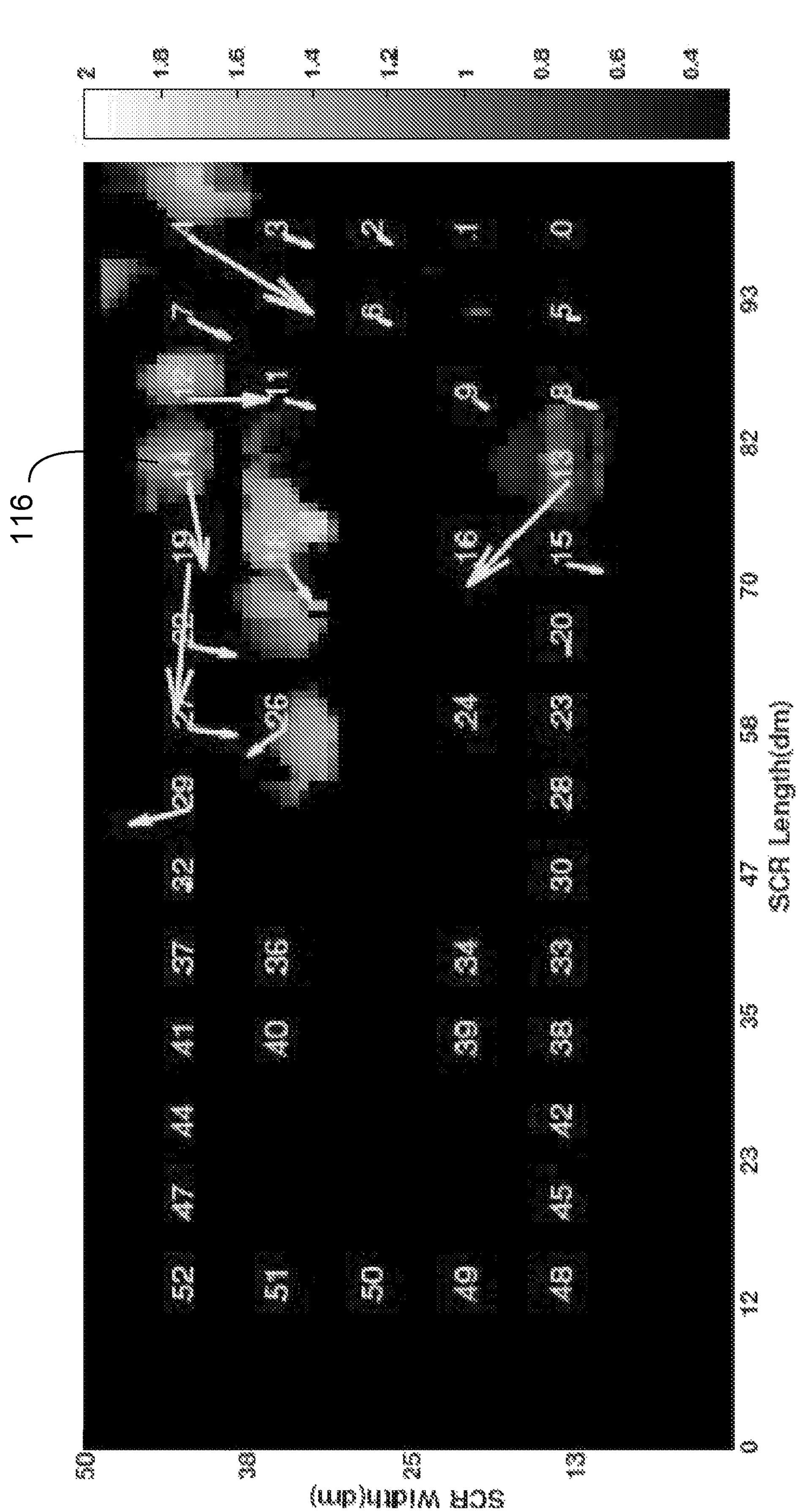
FIG. 6 is a TOF image showing a high-density entry of occupants into the room of FIG. 2.
Figure 7:
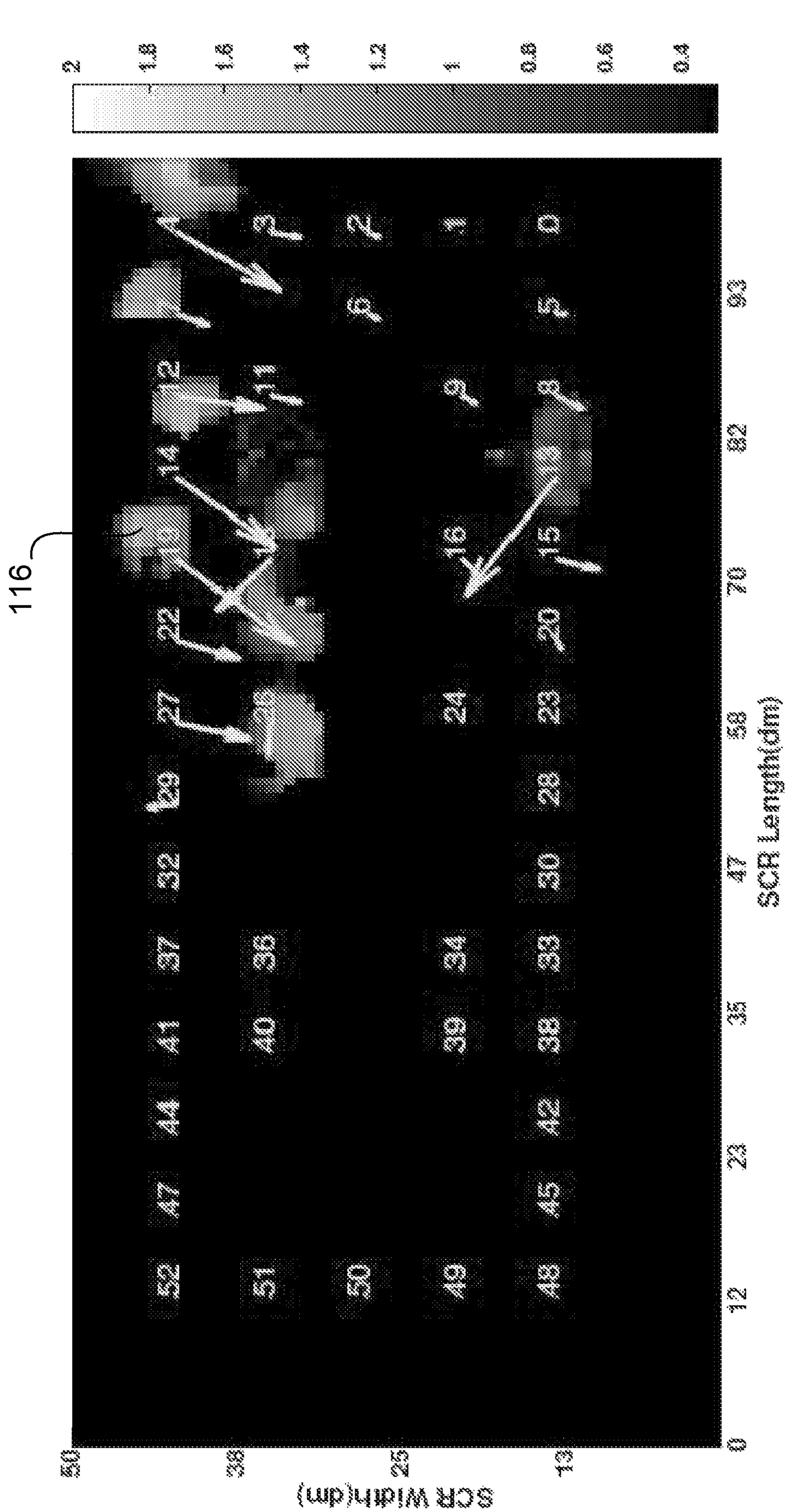
FIG. 7 is a TOF image showing new occupants entering the room of FIG. 6.

In another exemplary embodiment, the system 100 detects fourteen occupants 116 during a meeting in an SCR 110, as shown in FIG. 6. Occupants 116 enter the room 110 quickly, occasionally congregating before taking seats at the start at the meeting. As a result, during entry, there is very little distance between the individual occupants 116 and there are frequently multiple occupants 116 in the view of the individual color sensors 114 preventing the color sensors 114 from getting a unique color estimate for the individual occupants 116 that are entering the room 110 (seen at the top of the image). Additionally, for the sensor network sample period of 0.75 s used in this embodiment, occupants 116 occasionally enter and exit expected color sensing zones within seconds, or just a few sensor measurements which can make it difficult for the system 100 to get a better color estimation through filtering. FIG. 7 shows new occupants 116 entering the room at sensors 14 and 19, and stationary occupants 116 at sensors 13 and 26. The detected color response (sensors 8, 9, 13, 15, and 16) noted at the bottom of the images in FIGS. 6-7 where a single occupant 116 is in view of the individual sensors 114 has remained unchanged in the two images shows that the system 100 detects the color of occupants 116 while they are stationary and the only occupant 116 within view of the color sensors 114. By detecting the color of the occupant 116 while stationary, that color can then be used after a split/merge scenario (along with height data) to reassign occupant labels, if necessary.

For a single occupant 116 in the view of a color sensor 114, the detected sensor information is used to determine the direction of the detected color shift. In some embodiments, the wide FOV of the color sensors 114 in the SCR 110 means that whenever two or more occupants 116 are in view of the same sensor 114, the detected sensor response may be unable to differentiate between the individual color shift directions and localizing occupants 116 using their detected color shift directions may be less successful. However, while occupants 116 are occasionally interacting, resulting in tracking errors, there are times when the occupants 116 are stationary (sitting in the same general location), providing an opportunity to use filtered color shift information to better estimate the local spectral reflectance of an occupant 116 in the SCR 110.

Figure 8A:
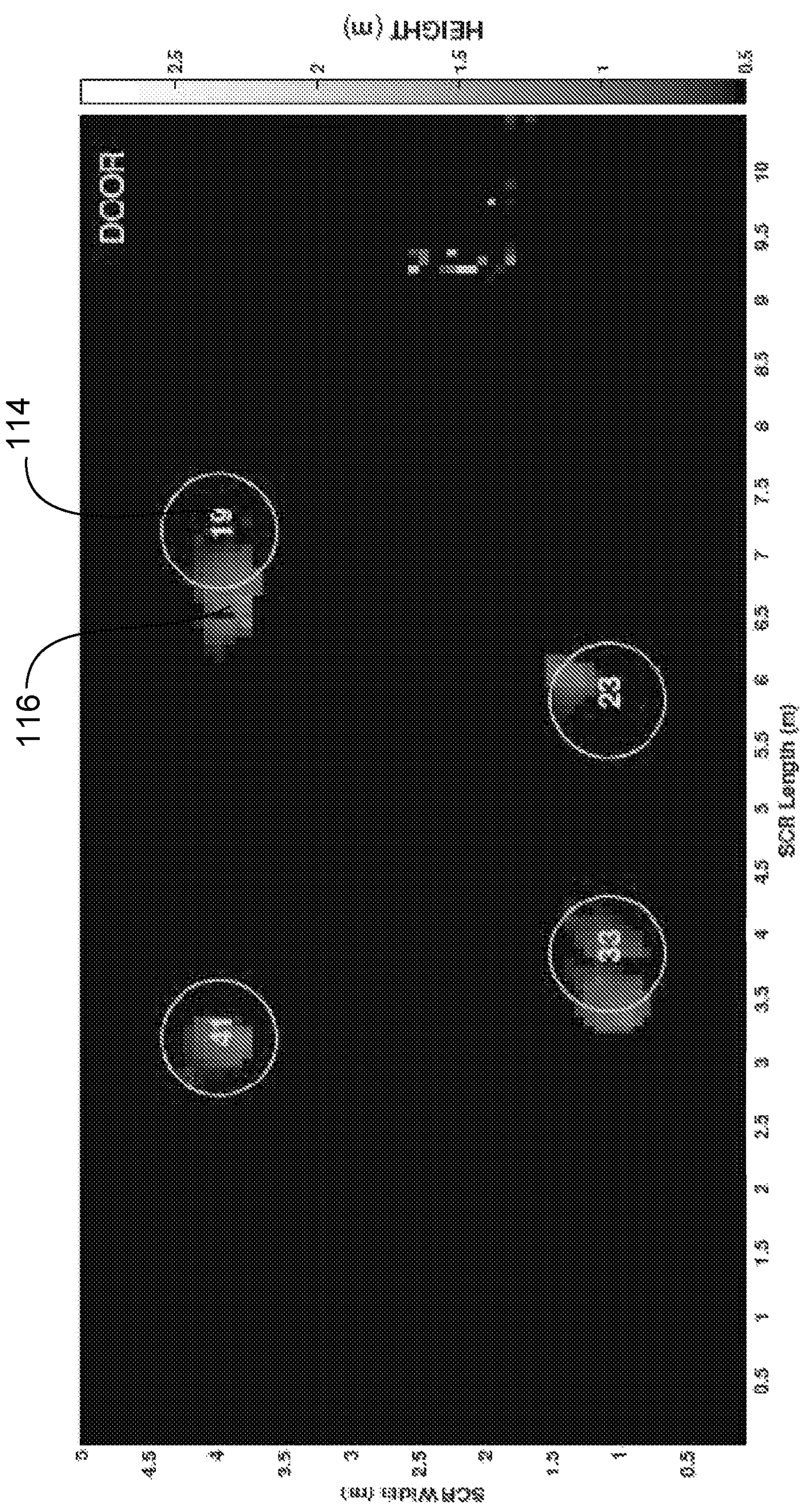
FIG. 8A is a TOF image showing the occupants and color sensors using for stationary occupant color estimation for a four-occupant dataset according to an exemplary embodiment of the present technology.
Figure 8B:
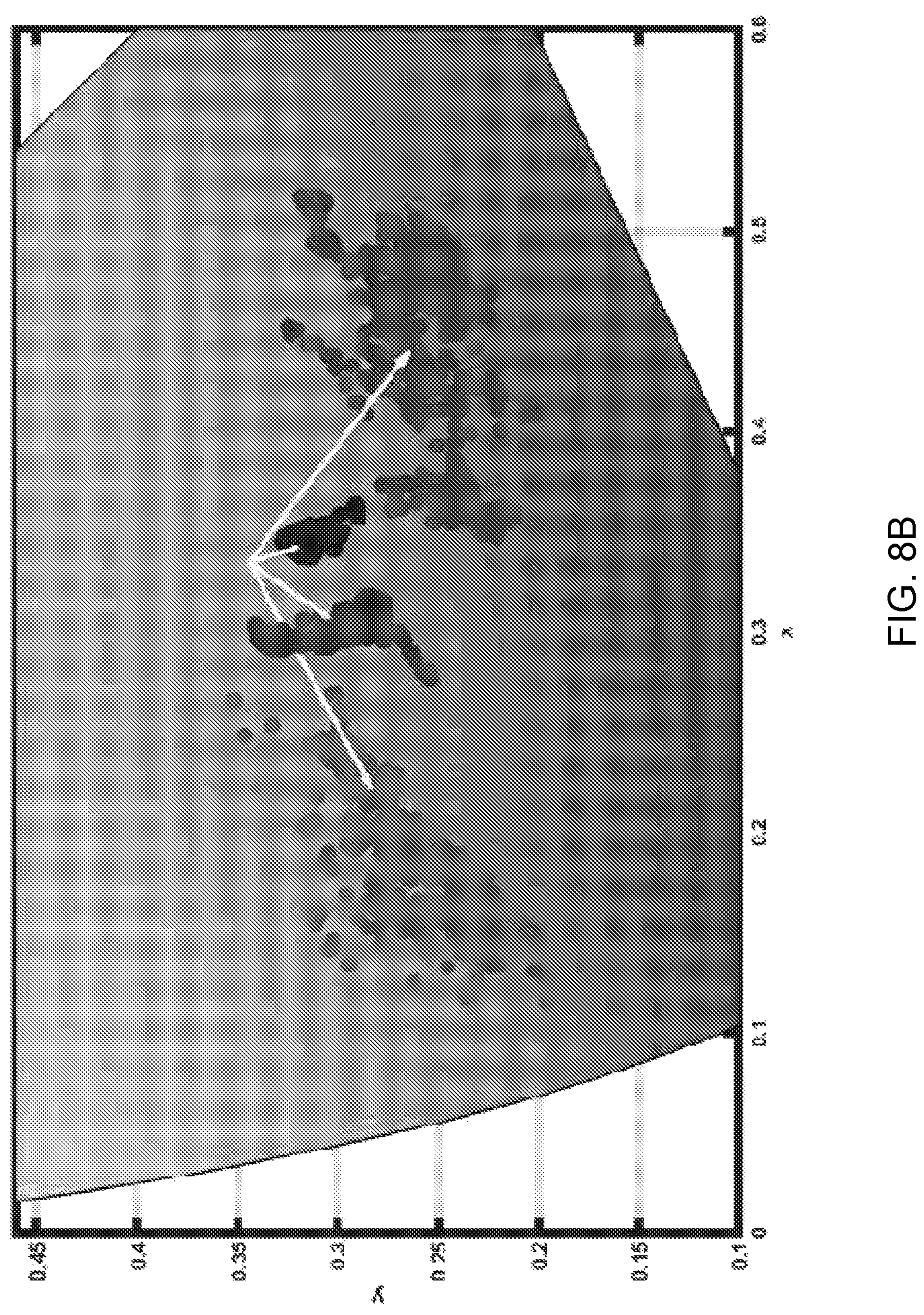
FIG. 8B is a CIE diagram of the four-occupant dataset of FIG. 8A showing each color point estimated using the mean of the last 5 seconds of detected color information.

In another exemplary embodiment using a four-occupant dataset, FIGS. 8A-8B show the color directions and associated noise of the detected sensor measurements when a 5 s time window is used to estimate the color of each of the occupants 116. Because of the spatial separability of the occupants 116 (i.e. less overlap in sensor view) and the spectral separability (i.e. difference in the occupants' clothing color), there is clear separation between the color clusters for the occupants 116 with only 5 s of color sensor data. Thus, for a low number of occupants 116 (such as four) wearing different colored clothing, use of color as a feature is used to improve tracking errors of TOF sensors.

Figure 9A:
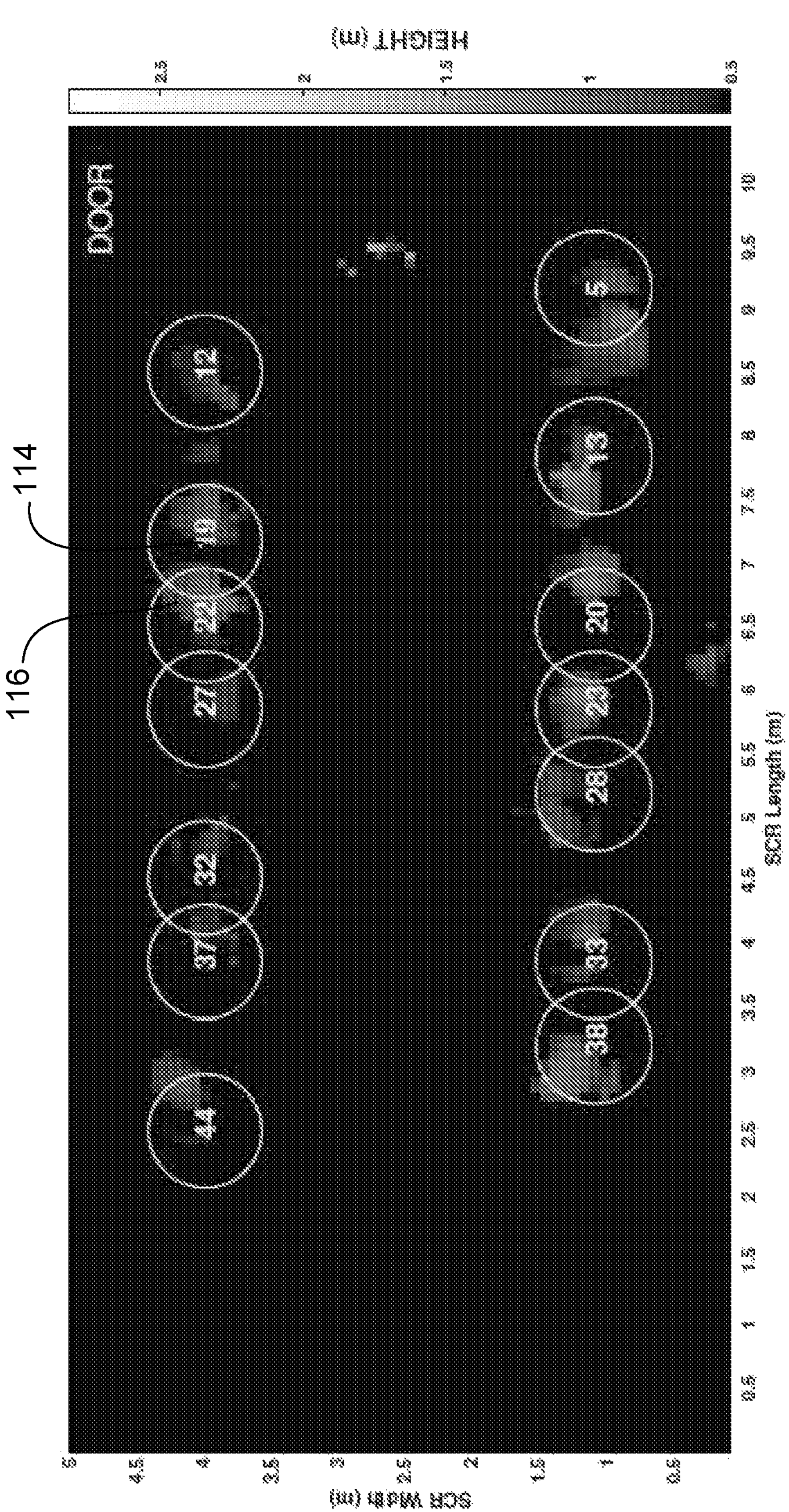
FIG. 9A is a TOF image showing the occupants and color sensors using for stationary occupant color estimation for a fourteen-occupant dataset according to an exemplary embodiment of the present technology.
Figure 9B:
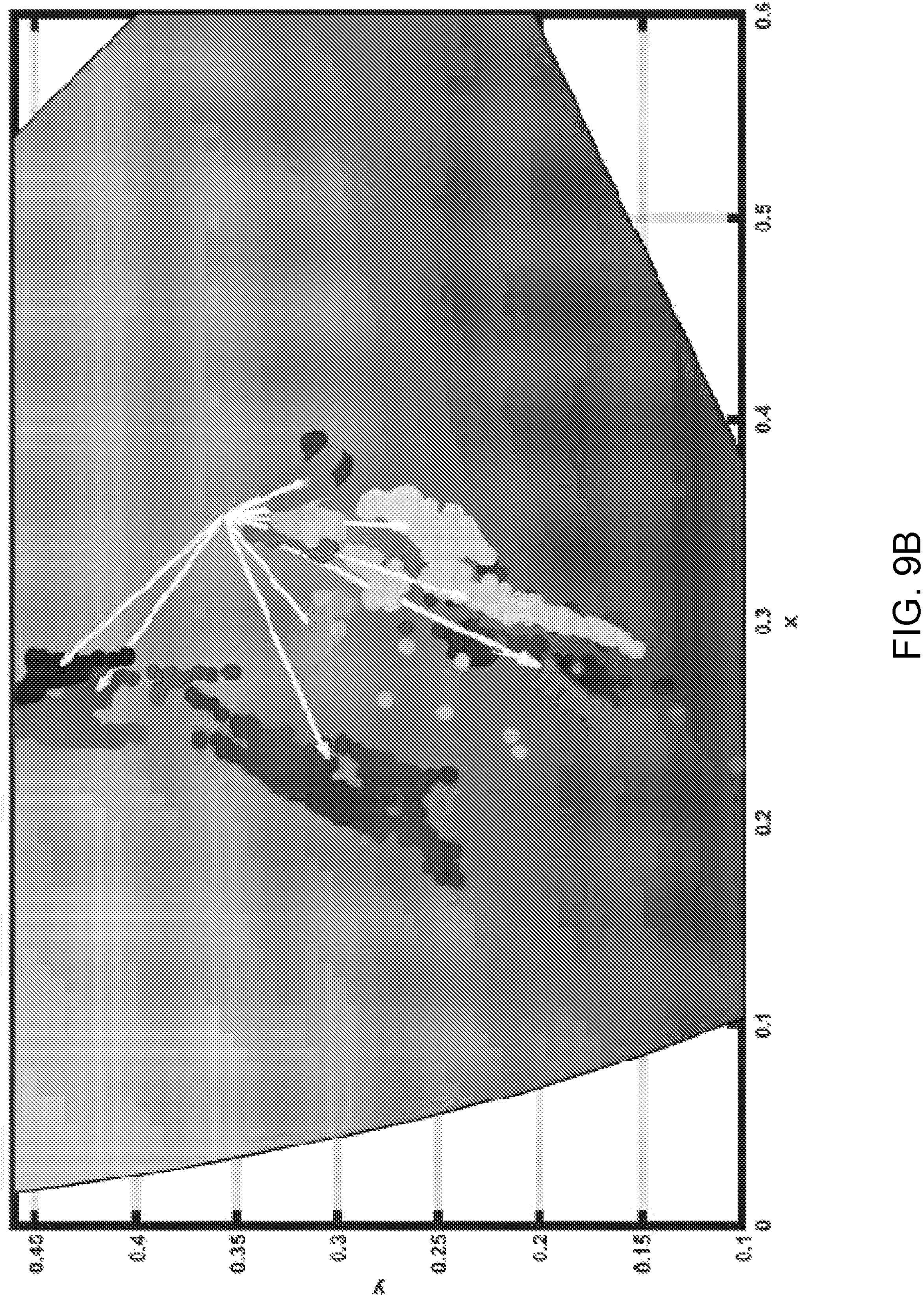
FIG. 9B is a CIE diagram of the fourteen-occupant dataset of FIG. 9A showing each color point estimated using the mean of the last 5 seconds of detected color information.
Figure 9C:
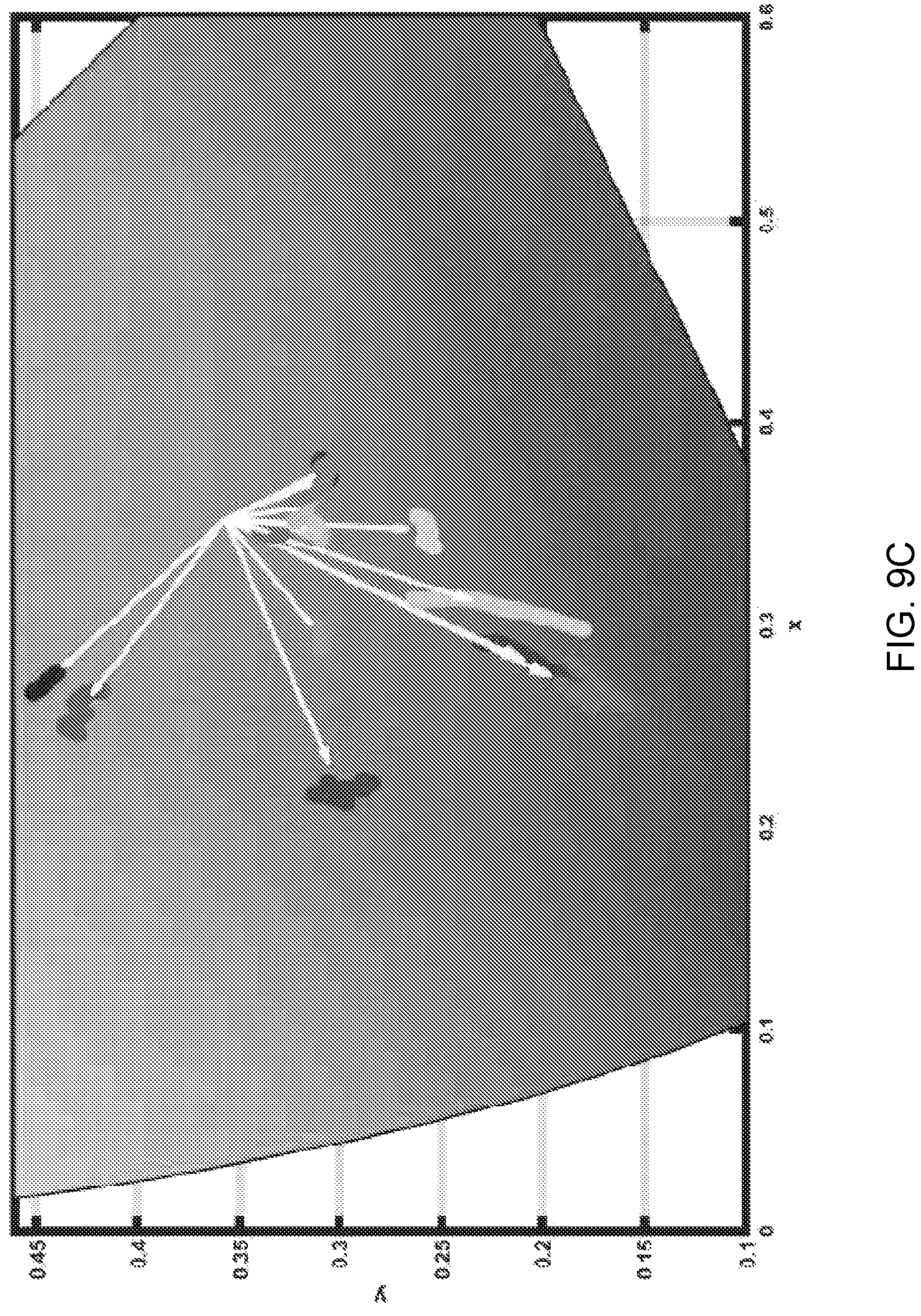
FIG. 9C is a CIE diagram of the fourteen-occupant dataset of FIG. 9A showing each color point estimated using the mean of the last 3 minutes of detected color information.

In another exemplary embodiment where the occupant dataset is increased to fourteen occupants 116 with no requirement that the occupants 116 wear different colored clothing, a 5 s color estimation window shows initial occupant 116 clusters forming using color sensor data, as shown in FIGS. 9A-9B. However, after 3 minutes of detected color information, clear clusters developed corresponding to the individual colors of the occupants 116, as shown in FIG. 9C. Notably, the color sensors 114 are able to detect color shifts from a background spectral map, identifying when something changes at that sensor location since the last map estimation, similar to background height shifts that can be detected using single-pixel TOF sensors that, as active sensors, have higher power requirements than the color sensors 114. In some embodiments, the system 100 uses color sensors 114 that have better spectral sensitivity and spatial resolution in combination with TOF sensors for further improved performance.

Accordingly, the present technology permits lower energy, cost effective use of battery powered sensors for occupant centric building control while preserving privacy or monitoring occupancy and movement patterns in commercial and residential building and healthcare facilities. Low cost, battery operated, and networked sensors enable broader adoption of the present technology as it can be installed without running wired electrical power to distributed network of sensors.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. A system for detecting occupants in a room, comprising:

at least one first sensor configured to establish a background color map of the room in an unoccupied state and to detect color shift data resulting from at least one occupant entering the room;

at least one second sensor configured to determine height data of the at least one occupant; and a controller configured to receive the color shift data and the height data and to generate equipment-control signals to operate at least one occupant-centric system, wherein the controller is further configured to generate sensor-control signals to power on and operate the at least one second sensor in response to receiving the color shift data from the at least one first sensor.

2. The system of claim 1, wherein the at least one second sensor is further configured to determine velocity data of the at least one occupant and to communicate the velocity data to the controller.

3. The system of claim 1, wherein the at least one first sensor comprises RGB color sensors.

4. The system of claim 1, wherein the at least one second sensor comprises time-of-flight sensors.

5. The system of claim 1, wherein the at least one occupant-centric system comprises a lighting system to illuminate the room.

6. The system of claim 1, wherein the at least one occupant-centric system comprises an HVAC system to supply conditioned air to the room.

7. The system of claim 1, wherein the controller is further configured to assign a digital label to the at least one occupant for tracking the at least one occupant's position in the room.

8. A method for detecting occupants in a room, comprising:

detecting, via a first sensor system, the spectral reflectance of the room in an unoccupied state to determine a background color map of the room;

detecting, via the first sensor system, color shift data resulting from at least one occupant entering the room and changing the spectral reflectance of the background color map;

communicating the color shift data to a controller configured to generate sensor-control signals in response to receiving the color shift data;

communicating the sensor-control signals to a second sensor system to power on and operate the second sensor system;

detecting, via the second sensor system, height data of the at least one occupant;

communicating the height data to the controller;

generating, via the controller, equipment-control signals to operate at least one occupant-centric system; and communicating the equipment-control signals to the at least one occupant-centric systems.

9. The method of claim 8, further comprising:

detecting, via the second sensor system, velocity data of the at least one occupant; and communicating the velocity data to the controller.

10. The method of claim 8, wherein before the step of generating equipment-control signals, further comprising:

analyzing the height data to determine whether the at least one occupant is a human.

11. The method of claim 8, further comprising:

assigning a digital label to the at least one occupant; and tracking the at least one occupant's position in the room.

12. The method of claim 8, wherein the first sensor system comprises a plurality of RGB color sensors.

13. The method of claim 8, wherein the second sensor system comprises a plurality of time-of-flight sensors.

14. The method of claim 8, wherein the at least one occupant-centric system comprises a lighting system to illuminate the room.

15. The method of claim 8, wherein the at least one occupant-centric system comprises an HVAC system to supply conditioned air to the room.

* * * * *